United States Patent [19]
Sato

[11] Patent Number: 5,485,314
[45] Date of Patent: Jan. 16, 1996

[54] STANDARD ZOOM LENS

[75] Inventor: Haruo Sato, Kawasaki, Japan

[73] Assignee: Nikon Corporation, Tokyo, Japan

[21] Appl. No.: 283,749

[22] Filed: Aug. 1, 1994

Related U.S. Application Data

[63] Continuation of Ser. No. 24,215, Mar. 1, 1993, abandoned.

[30] Foreign Application Priority Data

Mar. 6, 1992 [JP] Japan ................................. 4-49471

[51] Int. Cl.$^6$ ............................................. G02B 15/14
[52] U.S. Cl. ............................................. 359/691; 359/713
[58] Field of Search ............................... 359/680, 681, 359/682, 691, 713, 689

[56] References Cited

U.S. PATENT DOCUMENTS

| | | | |
|---|---|---|---|
| 4,195,912 | 4/1980 | Doi et al. | 359/682 |
| 4,560,253 | 12/1985 | Ogino | 359/682 |
| 5,005,955 | 4/1991 | Ohshita | 359/691 |
| 5,339,195 | 8/1994 | Ogata | 359/691 |
| 5,381,268 | 1/1995 | Sato | 359/691 |

FOREIGN PATENT DOCUMENTS 61-42246  9/1979  Japan .

*Primary Examiner*—Scott J. Sugarman
*Attorney, Agent, or Firm*—Shapiro and Shapiro

[57] ABSTRACT

A compact standard zoom lens with a power ratio of the order of 2.7 and a wide-angle field angle of about 74° comprises: a first lens group constructed of a negative meniscus lens with its concave surface having a large curvature toward an image and a positive meniscus lens with its convex surface toward the object, the first lens group having negative refracting power on the whole; and a second lens group constructed of a plurality of lenses and having positive refracting power on the whole. The first lens group incorporates an aspherical surface. A process of variable power is performed by mutually altering a space between the first and second lens groups. The first and second lens groups are constructed to satisfy particular conditions.

31 Claims, 4 Drawing Sheets

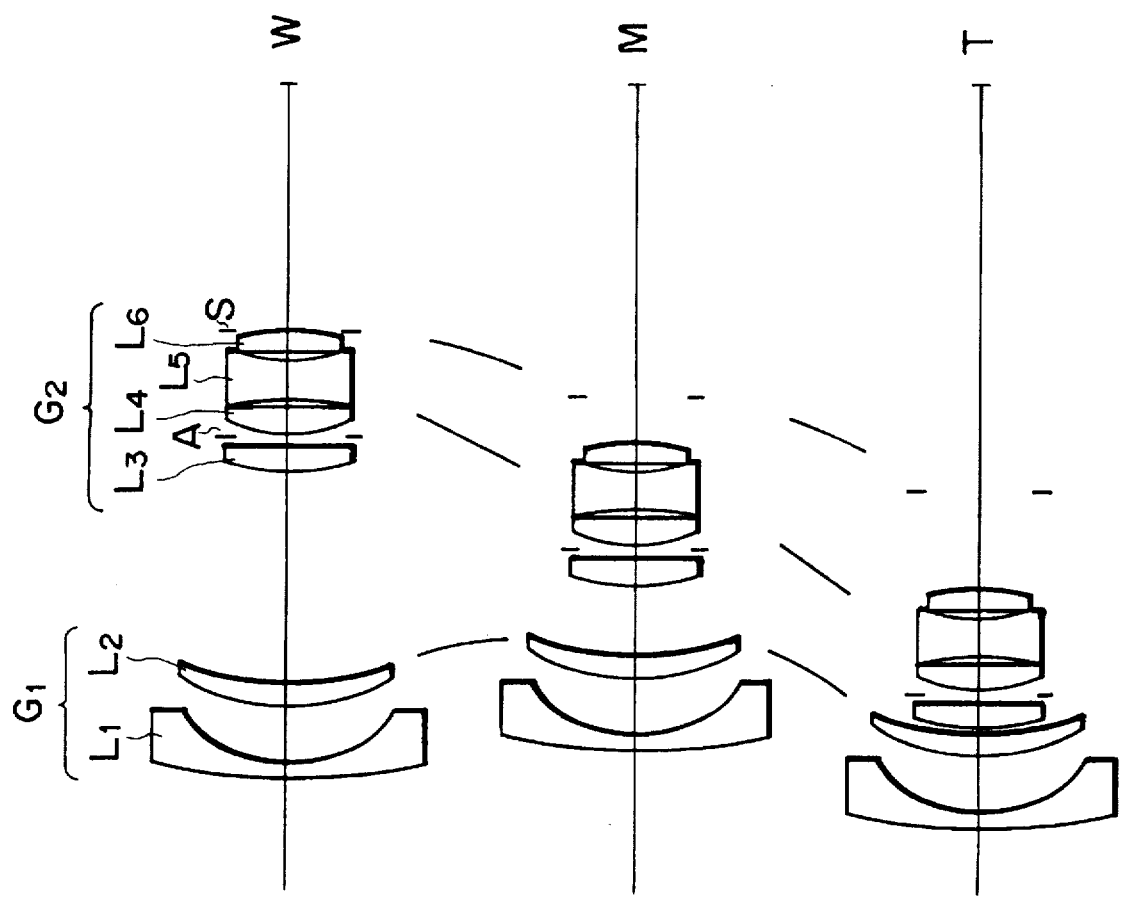

STANDARD ZOOM LENS

This is a continuation of application Ser. No. 08/024,215 filed Mar. 1, 1993, now abandoned.

BACKGROUND OF THE INVENTION

1. Field of the Invention

The present invention relates generally to a zoom lens and, more particularly, to a small-sized standard zoom lens constructed of a small number of lenses suitable for a standard installation into a 35 mm camera and having a large variable power ratio.

2. Related Background Art

In an interchangeable lens for a 35 mm still camera in recent years, there exists a zoom lens having a variable power ratio on the order of 1.8 including a standard field angle corresponding to an intermediate focal length of 50 mm among zoom lenses. Those zoom lenses are each constructed of two negative/positive lens groups having, sequentially from an object, negative refracting power and positive refracting power. It is felt that such a zoom lens has been completely established as a standard-installation lens in place of the standard lens (having a focal length of 50 mm or thereabouts if set in a 35 mm format). Consequently, this type of standard zoom lens is carried while being installed into the camera body as a commonly used lens. The indispensable condition is that the standard zoom lens should be reduced both in size and in weight at the minimum and should be low of price with a more sufficient image-forming performance.

The above-mentioned 2-group zoom lens is of the most suitable lens type for attaining the so-called standard zoom lens described above. In this connection, a variety of proposals have hitherto been given. Among them, U.S. Pat. No. 4,195,912 and Japanese Patent Publication No. 61-42246 and U.S. Pat. No. 4,560,253 disclose simple lens systems wherein a first lens group closest to an object is constructed of only two pieces of negative and positive lenses, thereby reducing the costs.

However, the zoom lens disclosed in U.S. Pat. No. 4,195,912 has a field angle of 52° at the wide-angle end and a variable power ratio on the order of 1.7. The zoom lens disclosed in Japanese Patent Publication No. 61-42246 has a field angle of 54° or 58° at the wide-angle end and a variable power ratio on the order of 1.7 or 1.8. The zoom lens disclosed in U.S. Pat. No. 4,560,253 has a focal length of 36 mm at the wide-angle end and a variable power on the order of 1.9. Any zoom lens is insufficient in terms of both of the field angle and the variable power ratio as a standard installation zoom lens.

A current dominant version of the lens for a standard installation into the camera body is a standard zoom lens exhibiting a variable power ratio on the order of 2.1 or more including a standard field angle. The indispensable conditions are the miniaturization and the reduction in costs as in the above-described standard zoom lens having the variable power ratio of approximately 1.8. However, a zoom hens consisting of two lens groups has been so far optimal to a fulfillment of reductions both in price and in size while keeping a sufficient performance in the zoom lenses each having the variable power ratio on the order of 1.8. In the case of ensuring a variable power ratio on the order of 2 or greater, however, it is difficult to directly employ the small-sized zoom lens type consisting of the two lens groups as in the prior arts. Rises both in size and in the number of lens elements are invariably induced for keeping the image-forming performance well.

Besides, according to Japanese Patent Application No.3-251188 filed by the same applicant as that of the present invention, there is proposed a small-sized 2-group zoom lens constructed of an extremely small number of lenses and exhibiting a variable power ratio of about 2.2 and a good image-forming performance as well by overcoming the defects inherent in the conventional 2-group zoom lens. In the so-called standard zoom lenses in recent years, the main trend is on the verge of shifting to a zoom lens having a variable power ratio of approximately 2.7 including a field angle of about 74°. It is very hard to attain this condition by directly using the conventional zoom lens type. A tendency is that the zoom lens is constructed of more lens groups and increases both in size and in costs.

Namely, when considered on the line of extension of the conventional technology, with the increased variable power ratio and field angle, the first lens group of the 2-group zoom lens is commonly constructed of at least three pieces of negative/positive lenses. Even when an aspherical surface is employed for compensating a distortion, it is difficult to compose the first lens group by two pieces of negative/positive lenses in the zoom lens having a wide field angle and a high variable power ratio. In addition, the lenses of the first lens group tend to increase in configuration. This largely contributes to an increase in size of the whole lens system. Besides, the number of lenses having a large diameter also increases. It is obvious that an adverse influence is to be exerted on a cost performance.

It is also required that the number of lens elements be reduced in terms of keeping veiling glare well by decreasing ghost and flare.

From the reasons elucidated above, the first lens group is constructed of two pieces of negative/positive lenses by decreasing the number of lens elements to obtain the compact standard zoom lens having a field angle of approximately 74° at a variable power ratio of about 2.7 and exhibiting a good image-forming performance at low costs. It is further required that an adequate refracting power arrangement and an aspherical surface be incorporated for a higher performance.

Besides, U.S. Pat. No. 4,195,912 and Japanese Patent Publication No. 61-42246 stated earlier disclose the zoom lenses wherein the first lens group is constructed of two pieces of negative/positive lenses. In those zoom lenses, though the variable power ratio is as small as 1.6~1.8, a total length and a diameter of the front lens element are both large. Especially at the wide-angle end, the total length becomes remarkably large. For this reason, an oblique ray incident on the front lens element passes through a location far away from the optical axis, and hence the diameter of the front lens element increases outstandingly. This results in such a defect that the lens system increases in size on the whole. Besides, the refracting power of the second lens groups is also weak. Therefore, the total length further elongates. A moving quantity of each group is also large. A fluctuation in comatic aberration and a curvature of field are not desirable in terms of aberration for largeness in size of the lens as a whole.

Still further, the zoom lens disclosed in U.S. Pat. No. 4,560,253 presents the following defect. The lens system has a relatively small total length and is therefore compact. However, the total length is large particularly at the wide-angle end. The oblique ray incident on the front lens element travels through the location far away from the optical axis, resulting in a dilation of diameter of the front lens element. This conduces to the increase in side of the first lens group as a whole, which in turn undesirably leads to a rise in the costs. Especially, the first lens group involves the use of the aspherical lens and therefore leads to a further rise in the costs.

As described above, the zoom lenses that have hitherto been proposed are each remarkably elongated in terms of total length at the wide-angle end. Those zoom lenses are, it can not be said, enough with respect to the compactness. Besides, the variable power ratios thereof are relatively small.

SUMMARY OF THE INVENTION

Accordingly, it is a primary object of the present invention to provide a standard zoom lens capable of having a variable power on the order of 2.7 and a field angle of approximately 74°, small in size throughout an overall variable power area and exhibiting a good image-forming performance though constructed simply.

To accomplish the object given above, according to one aspect of the present invention, there is provided a standard zoom lens, sequentially from an object, comprising: a first lens group constructed of a negative meniscus lens with its concave surface having a large curvature toward an image and a positive meniscus lens with its convex surface toward the object, the first lens group having negative refracting power on the whole; and a second lens group constructed of a plurality of lenses and having positive refracting power on the whole, wherein the first lens group includes at least one aspherical surface in the lens surfaces of the negative and positive meniscus lenses, a process of variable power is performed by mutually altering a group-to-group space between the first and second lens groups, and the first and second lens groups are constructed to further satisfy the following conditions:

$$0.6 < f_2/|f_1| < 1.0$$

$$1.0 \leq X_2/f_W \leq 1.8$$

where $f_1$: the focal length of the first lens group, $f_2$: the focal length of the second lens group, $X_2$: the moving quantity of the second lens group from the wide-angle end to the telephoto end during the process of variable power, and $f_W$: the focal length of the whole system at the wide-angle end.

As stated above, according to the present invention, the zoom lens having a variable power ratio as high as about 2.7 includes the first negative lens group and the second positive lens group which cooperate to vary a magnification by mutually altering a group-to-group space. The first lens group is constructed of the negative and positive lenses. Further, the aspherical surface is incorporated therein for fulfilling this. This aspherical surface acts not only to simply compensate a distortion at the wide-angle end but also to compensate all of off-axis aberrations well. The aspherical surface is incorporated in consideration of a balance with a third-order aberration especially by sufficiently utilizing a conical coefficient K and high-order terms of the aspherical surface. This lens group is thereby constructed of only two pieces of lenses. The small-sized zoom lens exhibiting a high variable power ratio and also a good image-forming performance is obtained under the conditions described above.

Still further, a diameter of the front lens element is reduced by shrinking the total length at the wide-angle end. The aberration at the telephoto end is well compensated. For this purpose, it is desirable that the lens system be constructed to satisfy the following condition.

$$0.85 \leq |f_1|/(f_W f_T)^{1/2} \leq 1.2$$

where $f_T$: the focal length of the whole system at the telephoto end.

Other objects, advantages and effects of the present invention will become apparent during the following full discussion in conjunction with the accompanying drawings.

BRIEF DESCRIPTION OF THE DRAWINGS

FIGS. 2A through 2C are views each illustrating a lens geometry and how the lens group moves from the wide-angle end to the telephoto end in a second embodiment of this invention;

DESCRIPTION OF THE PREFERRED EMBODIMENTS

Embodiments of the present invention will hereafter be described in detail with reference to the accompanying drawings.

Figures 1A, 1B, 1C:
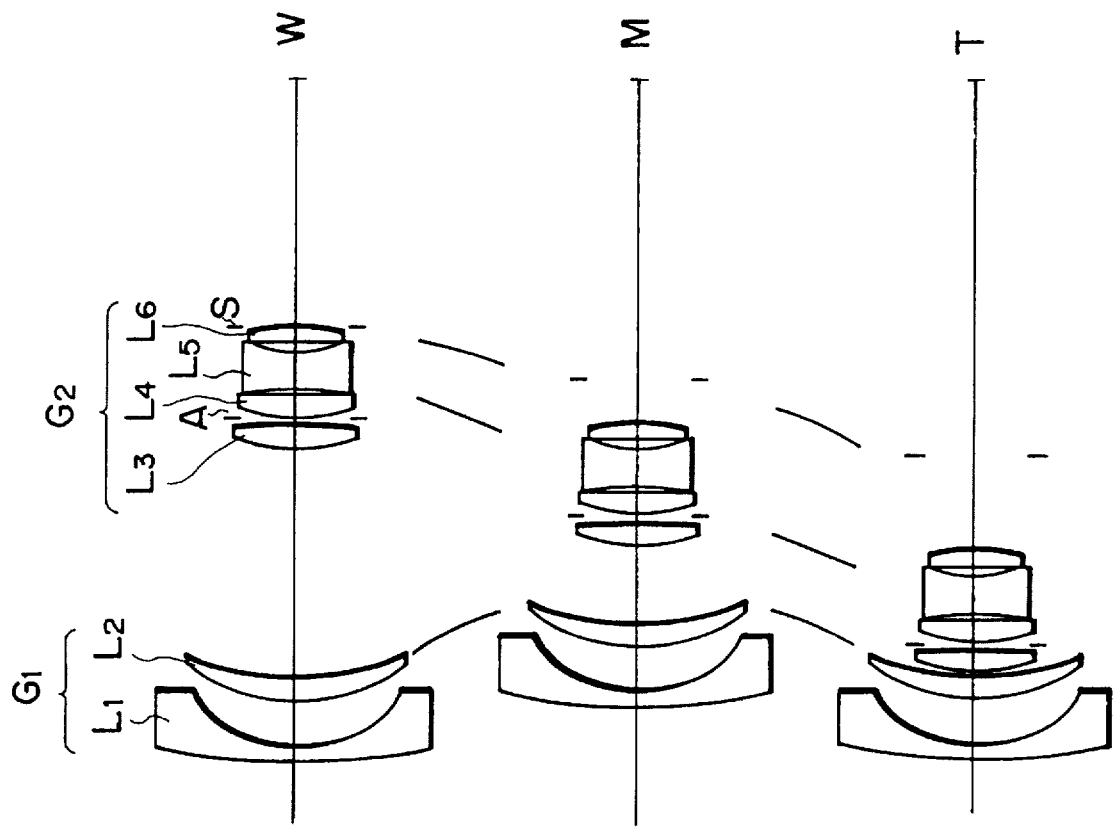
FIGS. 1A through 1C are views each illustrating a lens geometry and how a lens group moves from a wide-angle end to a telephoto end in a first embodiment of the present invention.
Figures 3A, 3B, 3C:
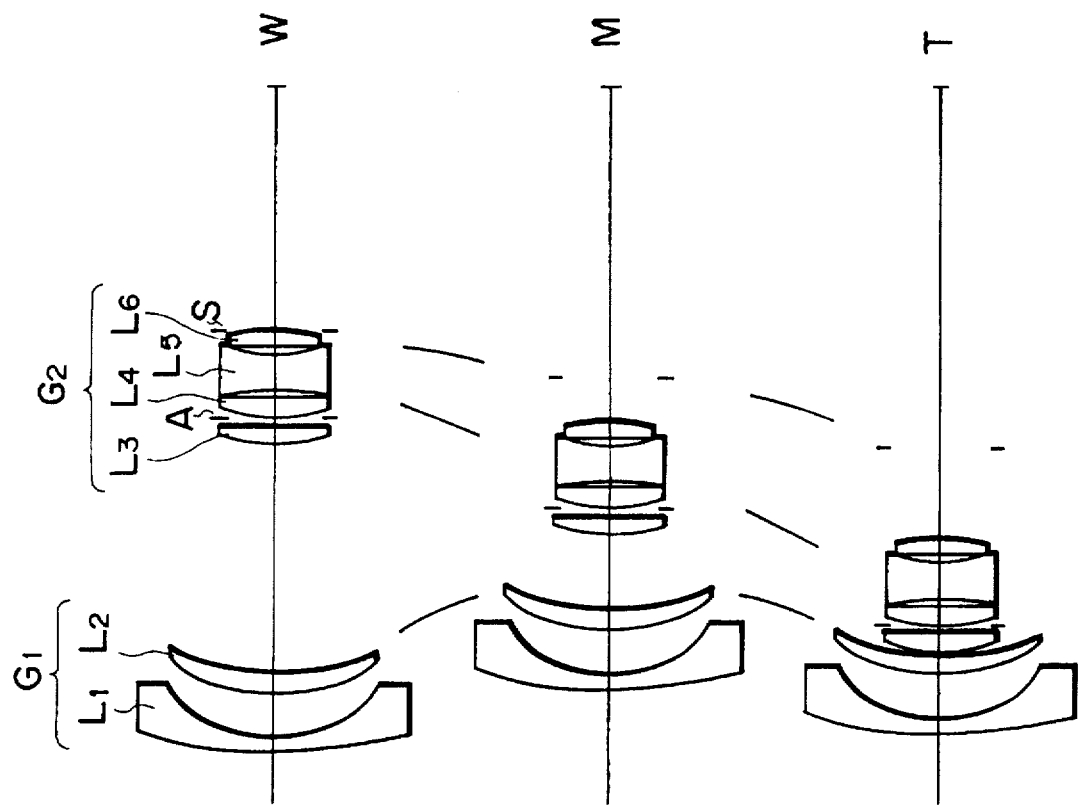
FIGS. 3A through 3C are views each illustrating a lens geometry and how the lens group moves from the wide-angle end to the telephoto end in the first embodiment of this invention.
Figures 4A, 4B, 4C:
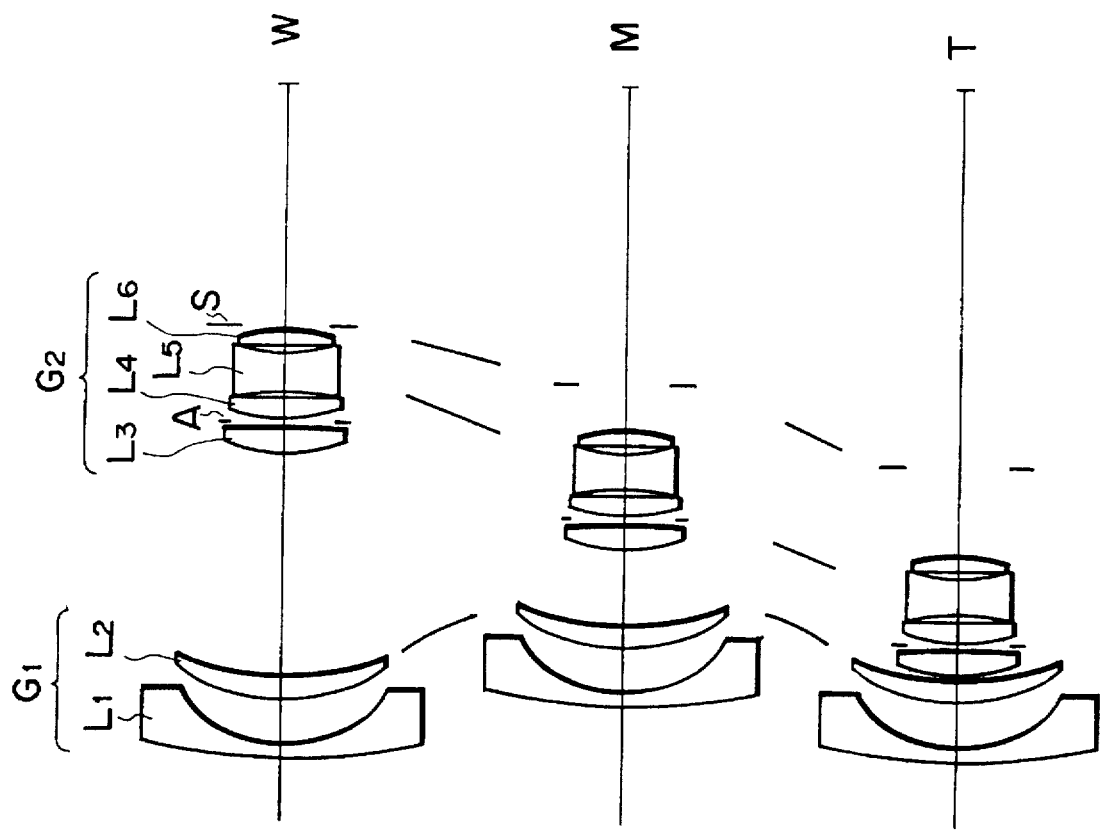
FIGS. 4A through 4C are views each illustrating a lens geometry and how the lens group moves from the wide-angle end to the telephoto end in the second embodiment of this invention.

FIGS. 1A–4C are views of lens geometries, respectively showing first through fourth embodiment of the present invention. Any zoom lens consists of, sequentially from an object, a first lens group $G_1$ having negative refracting power on the whole and a second lens group $G_2$ having positive refracting power on the whole. The zoom lens is constructed to vary a magnification by altering a group-to-group space between the first lens group $G_1$ and the second lens group $G_2$. Further, the first lens group $G_1$ is composed of, sequentially from the object in any embodiment, a first negative meniscus lens $L_1$ with its concave surface having a large curvature toward an image and a second positive meniscus lens $L_2$ with its convex surface toward the object. At least one surface of the lenses of the first lens group $G_1$ is formed as an aspherical surface. The second lens group $G_2$ is, as illustrated in the Figure, composed of a plurality of lenses $L_3$~$L_6$. Further, the first and second lens groups $G_1$, $G_2$ are constructed to satisfy the following conditions:

$$0.6 < f_2/|f_1| < 1.0 \tag{1}$$

$$1.0 \leq X_2/f_W \leq 1.8 \tag{2}$$

where $f_1$: the focal length of the first lens group $G_1$, $f_2$: the focal length of the second lens group $G_2$, $X_2$: the moving quantity of the second lens group $G_2$ from the wide-angle end to the telephoto end during a process of variable power, and $f_W$: the focal length of the whole system at the wide-angle end.

A zoom lens according to the present invention has a high magnification ratio enough to reach a variable power ratio on the order of 2.7. The first lens group $G_1$ of the zoom lens is constructed of two pieces of the negative lens $L_1$ and the positive lens $L_2$. Further, the aspherical surface is incorporated therein for attaining a good image-forming performance based on this lens construction. The aspherical surface is not simply intended to compensate a distortion at the wide-angle end that has hitherto been hard to compensate with the spherical surface as in the prior art by merely incorporating the aspherical surface. The aspherical surface is incorporated in view of a balance with a third-order aberration by compensating all of out-of-axis aberrations and sufficiently utilizing a conical coefficient K and high-order terms of the aspherical surface. The spherical surface is used in this manner, whereby the first lens group $G_1$ can be constructed of only two pieces of the negative lens $L_1$ and the positive lens $L_2$. According to this invention, the conical coefficient K is used instead of the high-order terms (especially the tenth- or higher-order terms). The conical coefficient K starts exhibiting an influence from the terms larger than the second-term of an aspherical surface coefficient. A larger influence appears with a higher-order term. Hence, even if the high-order term is not shown apparently, there exists the same effect as that when the high-order terms are present. It is therefore possible to easily incorporate the aspherical surface at a high efficiency in terms of design.

The following is an explanation of a relationship between the total length and the refracting power, wherein the zoom lens constructed of the two lens groups is exemplified. In general, the negative/positive 2-group zoom lens is constructed in the following relationship:

$$f_1 = -(f_W f_T)^{1/2} \quad \text{(a)}$$

where $f_W$ is the focal length of the whole system at the wide-angle end, $f_T$ is the focal length of the whole system at the telephoto end, and $f_1$ is the focal length of the first negative lens group $G_1$. In this case, the total lengths both at the wide-angle and at the telephoto end become equal, and a variation in the total length due to the variable power is minimized. Accordingly, if the focal length $f_1$ of the first lens group $G_1$ is selected to induce a remarkable deviation from this relationship, the variation in the total length due to the variable power disadvantageously outstandingly increases. Further, the following relationship is established:

$$f_T = f_1 \cdot \beta_T \quad \text{(b)}$$

where $\beta_T$ is the magnification of the second lens group $G_2$ defined as a converging group on the telephoto side. By the way, it is required that the second lens group $G_2$ on the telephoto side be employed in excess of life-size power ($\beta$= 1) to provide compactness. Still further, for satisfying each of the relational formulae (a) and (b) while compactly compensating the aberration well, each lens group is employed with relatively large refracting power. Consequently, a practical tendency has hitherto been such that each lens group is composed of a great number of lenses. This in turn induces an increase in thickness of each lens group and reduces an effect of miniaturization.

In accordance with this invention unlike the prior arts, the refracting power of the first and second lens groups $G_1$, $G_2$ is set suitable for the miniaturization in view of the relationships of the foregoing equations (a) and (b). The first lens group defined as a diverging lens group is constructed of two pieces of the negative lens $L_1$ and the positive lens $L_2$. With this construction, there is attained the miniaturized zoom lens at a low cost, wherein the variable power ratio is on the order of 2.7, and the variation in the total length due to the variable power is small.

The conditional formula (1) sets an adequate focal length ratio of the first lens group $G_1$ to the second lens group $G_2$. If over an upper limit of the conditional formula (1), the following two cases (1) and (2) can be presumed:
(1) a case where the focal length of the first lens group $G_1$ is strikingly small; and
(2) a case where the focal length of the second lens group $G_2$ is strikingly large.

In the zoom lens having the high magnification ratio according to this invention in the case (1), aspherical aberration is compensated with difficulty. Besides, a lower comatic aberration is also deteriorated. Undesirably, an inward comatic tendency is present.

While in the case (2), the moving quantity of the second lens group $G_2$ in connection with the variable power increases. The variation in the total length becomes large° In addition, a space necessary for the variable power between the first and the second lens groups $G_1$, $G_2$ is remarkably narrowed at the telephoto end. The first and second lens groups $G_1$, $G_2$ mechanically interfere with each other. As a matter of fact, the variable power ratio can not be increased.

Further, whereas if under a lower limit of the conditional formula (1), the following two cases (3) and (4) can be presumed:
(3) a case where the focal length of the first lens group $G_1$ is outstandingly large; and
(4) a case where the focal length of the second lens group $G_2$ is outstandingly small.

In the case (3), the total length is strikingly large at the wide-angle end. A diameter of the front lens element therefore increases. Undesirably, this leads to not only an increase in size of the overall lens system but also a rise in costs. If the diameter of the front lens element is reduced, however, this disadvantageously causes a lack in amount of marginal rays.

While in the case (4), the refracting power of the second lens group $G_2$ goes up. Undesirably, a back focus therefore becomes insufficient. Besides, it is also disadvantageously difficult to compensate the spherical aberration particularly at the telephoto end as a problem in terms of the aberration.

The conditional formula (2) prescribes the moving quantity of the second lens group $G_2$ on the occasion of the variable power.

According to this invention, though the first lens group is constructed of two pieces of the negative/positive lenses, yet a high magnification enough to reach a variable power ratio on the order of 2.7 is attained. For this purpose, the proper refracting power of the second lens group $G_2$ is required as in the first lens group $G_1$. In the zoom lens constructed of two lens groups having a fixed variable ratio, a magnitude of the moving quantity of the second lens group $G_2$ due to the variable power indicates a magnitude of the refracting power of the second lens group $G_2$. Hence, setting of the moving quantity of the second lens group $G_2$ implies setting of the refracting power, necessary for attaining this variable power ratio, of the second lens group $G_2$ in the zoom lens exhibiting a high variable power ratio.

Then, if over an upper limit of the conditional formula (2), the moving quantity of the second lens group $G_2$ remarkably increases. It is therefore difficult to ensure an air space between the first and the second lens groups $G_1$. $G_2$ enough not to interfere with each other. Besides, if forcibly expanded, this undesirably conduces to an increase in size.

Further, the refracting power of the second lens group $G_2$ is weakened, and hence the back focus increases. This is contrary to the miniaturization. Whereas if under a lower limit of the conditional formula (2), and when ensuring a sufficient variable power ratio, the refracting power of the second lens group $G_2$ becomes too large. The back focus therefore becomes too small. This results in an impossibility for use with a single-lens reflex camera. Further, from the viewpoint of the aberration, it is difficult to compensate the spherical aberration on the telephoto side and an upper comatic aberration. A desirable optical performance can not be obtained. Hence, though this range is desirable, the lower limit is set to preferably 1.1 or under to obtain a more stabilized optical performance.

Furthermore, as in the present invention, the refracting power of the first lens group $G_1$ is set suitable for the miniaturization in consideration of the relationships of the foregoing formulae (a) and (b). At the same time, the first lens group $G_1$ is constructed of two pieces of the negative lens $L_1$ and the positive lens $L_2$. There is attained a small-sized zoom lens in which the variable power ratio is on the order of 2.7, and the variation in the total length due to the variable power is small. For this purpose, it is desirable that the first and second lens groups be constructed to satisfy the following conditions.

$$(0.85 \leq |f_1|/(f_W f_T)^{1/2} \leq 1.2 \tag{3}$$

$$0.4 \leq |f_1|/f_T \leq 0.9 \tag{4}$$

$$0.4 \leq f_2/f_T \leq 0.6 \tag{5}$$

$$1.1 < (D_W - D_T)/f_W < 1.7 \tag{6}$$

where
$f_1$: the focal length of the first lens group $G_1$,
$f_2$: the focal length of the second lens group $G_2$,
$f_W$: the focal length of the whole system at the wide-angle end,
$f_T$: the focal length of the whole system at the telephoto end,
$D_W$: the group-to-group space between the first lens group $G_1$ and the second lens group $G_2$ for the variable power at the telephoto end, and
$D_T$: the group-to-group space between the first lens group $G_1$ and the second lens group $G_2$ for the variable power at the telephoto end.

The conditional formula (3) relates to a variation in the total length in an overall area of the variable power discussed above. If a value of this formula exceeds 1.0, this implies an increase in the total length at the wide-angle end. Whereas if less than 1.0, this implies an increase in the total length at the telephoto end.

If over an upper limit of the conditional formula (3), the total length becomes remarkably large at the wide-angle end. A diameter of the front lens element is dilated. This disadvantageously leads to not only the increase in size of the whole lens system but also the rise in the costs. Further, if the diameter of the front lens element is forcibly narrowed, disadvantageously the amount of marginal rays becomes insufficient. Whereas if under a lower limit of the conditional formula (3), and when having the high variable power ratio as in the present invention, the spherical aberration is hard to compensate especially at the telephoto end. Besides, the lower comatic aberration is deteriorated. Undesirably, the inner comatic tendency is present.

Hence, the range defined by the conditional formula (3) is desirable in this invention. However, if the upper limit is set to 1.1 or under, there is desirably produced a further effect in the miniaturization.

The conditional formula (4) gives a condition for further setting the focal length of the first lens group $G_1$. If over an upper limit of the conditional formula (4), the diameter of the front lens element is dilated. Undesirably, this in turn brings about a rise in size of the whole system. Whereas if under a lower limit of the conditional formula (4), the refracting power of the first lens group $G_1$ becomes too large. The aberration is hard to compensate with a simple construction as in the present invention. In particular, it is difficult to compensate the lower comatic aberration at the wide-angle end, the spherical aberration and the lower comatic aberration at the telephoto end.

Accordingly, though the range defined by the conditional formula (4) is desirable, if the upper limit is set to 0.8 or less, a more advantage in the miniaturization is favorably provided.

The conditional formula (5) gives a condition for setting the focal length of the second lens group $G_2$. If over an upper limit of the conditional formula (5), the refracting power of the second lens group $G_2$ is weakened, and the moving quantity augments. The necessary space between the first and second lens groups $G_1$, $G_2$ is disadvantageously narrowed. Besides, if a sufficient space is ensured, this undesirably causes the rise in size. Whereas if under a lower limit of the conditional formula (5), the refracting power of the second lens group $G_2$ is intensified. The spherical aberration at the telephoto end is compensated with difficulty. In addition, a fluctuation in the off-axis aberration such as a curvature of field due to the variable power becomes worse. Hence, though the range defined by the conditional formula (5) is desirable, if the upper limit is set to 0.55 or under, it is feasible to further exhibit an effect of this invention in terms of miniaturization.

The conditional formula (6) provides a condition for setting a difference between the group-to-group air space $D_W$ between the first and second lens groups $G_1$, $G_2$ at the wide-angle end and the group-to-group air space $D_T$ between the first and second lens groups $G_1$, $G_2$. If over an upper limit of the conditional formula (6), this implies that the refracting power of each group is weak, and the moving quantity of each group is large. Therefore, the whole lens system undesirably increases in size. Whereas if under a lower limit of the conditional formula (6), this implies that the refracting power of each group is outstandingly intensified. This is advantageous for miniaturization but causes a problem in terms of the image-forming performance. Especially, the curvature of field, the comatic aberration at the wide-angle end and the spherical aberration are undesirably deteriorated. Hence, this range is desirable.

It is desirable that the following conditions be met to further exhibit the effect of this invention well.

$$0.8 < Bf_W/f_W < 2 \tag{7}$$

$$-3 < q_1 < -1 \tag{8}$$

where
$Bf_W$: the back focus of the whole system at the wide-angle end, and
$q_1$: the configurational factor of the negative lens $L_1$ of the first lens group $G_1$.

(Note that the configurational factor is obtained such as: $q=(r_2+r_1)/(r_2-r_1)$. In the case of the aspherical lens, however, a substitute calculation is effected by using a paraxial radius of curvature. In the case of a so-called compound aspherical lenses compounded by a resinous material and a glass material, the calculation is done based on the paraxial radius of curvature of an air-contact surface.)

The conditional formula (7) gives a condition for setting a ratio of the back focus at the wide-angle end to the focal length at the wide-angle end. When exceeding an upper limit of the conditional formula (7), the back focus remarkably increases. Disadvantageously, the lens system gets large in size. Whereas if under a lower limit of the conditional formula (7), the back focus becomes too small. This unfavorably causes a disadvantage as a zoom lens for use with the single-lens reflex camera.

The conditional formula (8) provides a condition related to the configurational factor of the negative lens $L_1$ of the first lens group $G_1$. If under a lower limit of the conditional formula (8), the configuration of the negative meniscus lens is conspicuously curved. The principal ray having the maximum field angle in the first lens $L_1$ travels through a location spaced far away from the optical axis. The diameter of the front lens element is therefore remarkably dilated. Further, it is undesirably difficult to compensate the spherical aberration on the telephoto side. Whereas if over an upper limit of the conditional formula (8), the negative lens $L_1$ changes from a plano-concave shape into a biconcave shape. Disadvantageously, the lower comatic aberration at the wide-angle end and the curvature of field are hard to compensate. Hence, this range is desirable.

Incidentally, for exhibiting the effect of the present invention at the maximum, the first lens group $G_1$ is constructed of the negative meniscus lens $L_1$ and the positive meniscus lens $L_2$, whereby the off-axis aberration on the wide-angle side can be well compensated. Additionally, cemented lenses are incorporated in the second lens group $G_2$. It is thus possible to enhance a degree of freedom of compensation of Petzval's sum or of achromaticity. The second lens group $G_2$ is constructed of four pieces of positive/negative lenses. This construction is effective in attaining super miniaturization.

Further, according to the present invention, fundamentally the aspherical lens surface is incorporated in the first lens group $G_1$. As a matter of course, however, the spherical aberration at the telephoto end and the upper comatic aberration can be compensated with other lens surfaces incorporated therein, and the diameter can be also dilated as in the usage of the conventional aspherical surface.

Next, the constructions of the respective embodiments of this invention will be discussed in greater detail.

FIGS. 1A–1C, 2A–2C, 3A–3C and 4A–4C are views illustrating lens geometries in accordance with the first, second, third and fourth embodiments. In any embodiment, the first lens group $G_1$ exhibiting the negative refracting power is constructed of, sequentially from the object, a first negative meniscus lens $L_1$ with its convex surface toward the object and a second positive meniscus lens $L_2$ with it convex surface toward the object. The first negative meniscus lens $L_1$ has an aspherical surface closer to the image. On the other hand, the second lens group $G_2$ exhibiting the positive refracting power is constructed of, sequentially from the object, a third positive lens $L_3$, a fourth positive lens $L_4$, a fifth biconcave negative lens $L_5$ and a sixth biconvex positive lens $L_6$.

Further, the third positive lens $L_3$ of the second lens group $G_2$ is, in accordance with the first, second and fourth embodiments, a biconvex positive lens with its convex surface having a larger curvature toward the object. In the third embodiment, the third positive lens $L_3$ is a positive meniscus lens with its convex surface toward the object. Further, the fourth positive lens $L_4$ of the second lens group $G_2$ is, in accordance with the first and fourth embodiment, a positive meniscus lens with its convex surface toward the object. In the second and third embodiments, the fourth positive lens $L_4$ is a biconvex positive lens with its convex surface having a larger curvature toward the object. Still further, the fifth biconcave negative lens $L_5$ of the second lens group $G_2$ is, in each embodiment, a biconcave negative lens with its surface having a larger curvature toward the image. The sixth biconvex positive lens $L_6$ is, in each embodiment, a biconvex positive lens with its surface having a larger curvature toward the image.

Note that a stop S located closest to the image in the illustrative lens geometry in each embodiment is defined as a fixed diameter stop (flare stopper).

The following Tables 1–4 show values of items in the embodiments 1–4 of this invention. In Tables of the items in the embodiments, the symbol f is the focal length, $F_{NO}$ is the F-number, and $2\Omega$ is the field angle. Then, the numerals at the left end represent the order from the object side. The symbol r is the radius of curvature of the lens surface, d is the space between the lens surfaces. The refractive index n and the Abbe's number v are values with respect to a d-ray ($\lambda$=587.6 nm). Note that a value indicated by the symbol * is the paraxial radius of curvature of the aspherical surface.

Further, the aspherical surface shown by the value of the item is expressed by the following formula:

$$x = \frac{y^2/r}{1 + \{1 - (ky^2/r^2)\}^{1/2}} + c_2 y^2 + c_4 y^4 + c_6 y^6 + c_8 y^8 + c_{10} y^{10}$$

where x is the distance in the optical-axis direction from a tangent plane of the vertex of each aspherical surface at the height y from the optical axis in the perpendicular direction, r is the paraxial radius of curvature, k is the conical constant, and $c_n$ is the n-order aspherical surface coefficient.

TABLE 1

(First Embodiment)
f = 28.8–77.6
$2\omega$ = 76.6–30.8
$F_{NO}$ = 3.4–5.8

| | r | d | v | n |
|---|---|---|---|---|
| 1 | 98.649 | 2.20 | 49.5 | 1.77279 |
| 2 | *17.777 | 7.98 | | |
| 3 | 27.222 | 3.80 | 25.5 | 1.80458 |
| 4 | 43.912 | (d4) | | |
| 5 | 26.406 | 3.50 | 60.0 | 1.64000 |
| 6 | −169.878 | 1.40 | | |
| 7 | 22.198 | 3.75 | 64.1 | 1.51680 |
| 8 | 269.188 | 0.70 | | |
| 9 | −65.583 | 7.00 | 28.6 | 1.79504 |
| 10 | 18.649 | 1.35 | | |
| 11 | 141.028 | 2.60 | 33.7 | 1.64831 |
| 12 | −30.106 | (d12) | | |
| 13 | 0.000 | (d13) | | |

(Variable Space in the Variable Power)

| f | 28.8000 | 50.0000 | 77.6000 |
|---|---|---|---|
| DO | ∞ | ∞ | ∞ |
| d4 | 39.2787 | 13.4651 | 0.9926 |
| d12 | 0.0000 | 8.0000 | 16.0000 |
| d13 | 42.5746 | 50.7214 | 63.7424 |

(Aspherical Configuration of Second Surface)

k = 0.6882
c2 = 0.0000
c4 = −0.89347 × 10⁻⁶
c6 = −0.40061 × 10⁻⁸
c8 = 0.89063 × 10⁻¹¹
c10 = −0.10979 × 10⁻¹²

Note that the condition corresponding values of the lens data given above are shown as below.

$f_2/|f_1|=0.762$ (1)

$X_2/f_W=1.291$ (2)

$|f_1|/(f_W f_T)^{1/2}=1.01$ (3)

$|f_1|/f_T=0.618$ (4)

$f_2/f_T=0.471$ (5)

$(D_W-D_T)/f_W=1.33$ (6)

$Bf_W/f_W=1.48$ (7)

$q_1=-1.44$ (8)

TABLE 2

(Second Embodiment)
f = 28.8~77.6
2ω = 76.6~31.0
$F_{NO}$ = 4.1~5.8

|  | r | d | ν | n |
|---|---|---|---|---|
| 1 | 94.753 | 2.20 | 49.5 | 1.77279 |
| 2 | *17.281 | 9.75 | | |
| 3 | 27.780 | 3.70 | 23.0 | 1.86074 |
| 4 | 39.888 | (d4) | | |
| 5 | 31.343 | 4.50 | 60.0 | 1.64000 |
| 6 | −290.096 | 2.00 | | |
| 7 | 20.747 | 4.20 | 64.1 | 1.51680 |
| 8 | −1217.243 | 0.60 | | |
| 9 | −74.711 | 7.00 | 28.6 | 1.79504 |
| 10 | 18.885 | 1.45 | | |
| 11 | 84.036 | 3.50 | 35.7 | 1.62588 |
| 12 | −32.181 | (d12) | | |
| 13 | 0.000 | (d13) | | |

(Variable Space in the Variable Power)

| f | 28.8000 | 50.0000 | 77.6000 |
|---|---|---|---|
| DO | ∞ | ∞ | ∞ |
| d4 | 35.8192 | 12.3441 | 1.0018 |
| d12 | 0.0947 | 8.0947 | 16.0947 |
| d13 | 45.1311 | 55.4128 | 71.2131 |

(Aspherical Configuration of Second Surface)

k = 0.6917
c2 = 0.0000
c4 = −0.21867 × $10^{-5}$
c6 = −0.88603 × $10^{-8}$
c8 = 0.22651 × $10^{-10}$
c10 = −0.17494 × $10^{-12}$

Note that the condition corresponding values of the lens data given above are shown as below.

$f_2/|f_1|=0.862$ (1)

$X_2/f_W=1.46$ (2)

$|f_1|/(f_W f_T)^{1/2}=0.910$ (3)

$|f_1|/f_T=0.554$ (4)

$f_2/f_T=0.478$ (5)

$(D_W-D_T)/f_W=1.21$ (6)

$Bf_W/f_W=1.57$ (7)

$q_1=-1.45$ (8)

TABLE 3

(Third Embodiment)
f = 28.8~77.6
2ω = 76.6~30.8
$F_{NO}$ = 3.6~5.8

|  | r | d | ν | n |
|---|---|---|---|---|
| 1 | 74.101 | 2.20 | 46.5 | 1.80411 |
| 2 | *18.259 | 7.99 | | |
| 3 | 25.715 | 3.60 | 23.0 | 1.86074 |
| 4 | 36.317 | (d4) | | |
| 5 | 26.205 | 3.00 | 60.0 | 1.64000 |
| 6 | 652.876 | 1.50 | | |
| 7 | 23.921 | 3.60 | 60.0 | 1.64000 |
| 8 | −304.097 | 0.50 | | |
| 9 | −66.935 | 7.00 | 28.6 | 1.79504 |
| 10 | 17.959 | 1.45 | | |
| 11 | 128.259 | 2.50 | 32.2 | 1.67270 |
| 12 | −33.575 | (d12) | | |
| 13 | .000 | (d13) | | |

(Variable Space in the Variable Power)

| f | 28.8000 | 50.0000 | 77.6000 |
|---|---|---|---|
| DO | ∞ | ∞ | ∞ |
| d4 | 40.1821 | 13.4269 | .4998 |
| d12 | 0.1857 | 7.8143 | 15.8143 |
| d13 | 42.5776 | 49.9876 | 62.0488 |

(Aspherical Configuration of Second Surface)

k = 0.7512
c2 = 0.0000
c4 = −0.40277 × $10^{-7}$
c6 = −0.72902 × $10^{-8}$
c8 = 0.28656 × $10^{-10}$
c10 = −0.14031 × $10^{-12}$

Note that the condition corresponding values of the lens data given above are shown as below.

$f_2/|f_1|=0.727$ (1)

$X_2/f_W=1.23$ (2)

$|f_1|/(f_W f_T)^{1/2}=1.06$ (3)

$|f_1|/f_T=0.644$ (4)

$f_2/f_T=0.467$ (5)

$(D_W-D_T)/f_W=1.38$ (6)

$Bf_W/f_W=1.47$ (7)

$q_1=-1.65$ (8)

TABLE 4

(Fourth Embodiment)
f = 28.8~77.6
2ω = 76.6~30.8
$F_{NO}$ = 3.4~5.8

|  | r | d | ν | n |
|---|---|---|---|---|
| 1 | 97.086 | 2.20 | 49.5 | 1.77279 |
| 2 | 19.500 | .03 | 55.9 | 1.49712 |
| 3 | *16.891 | 7.81 | | |
| 4 | 26.633 | 3.80 | 25.5 | 1.80458 |
| 5 | 42.414 | (d5) | | |
| 6 | 25.554 | 4.10 | 60.0 | 1.64000 |
| 7 | −186.207 | 1.40 | | |
| 8 | 22.446 | 3.45 | 64.1 | 1.51680 |
| 9 | 267.680 | 0.70 | | |
| 10 | −61.313 | 6.85 | 28.6 | 1.79504 |
| 11 | 18.917 | 1.35 | | |

TABLE 4-continued (Fourth Embodiment)
$f = 28.8 \sim 77.6$
$2\omega = 76.6 \sim 30.8$
$F_{NO} = 3.4 \sim 5.8$

| 12 | 141.576 | 2.45  | 33.7 | 1.64831 |
|----|---------|-------|------|---------|
| 13 | −29.366 | (d13) |      |         |
| 14 | 0.000   | (d14) |      |         |

(Variable Space in the Variable Power)

| f   | 28.8000 | 50.0000 | 77.6000 |
|-----|---------|---------|---------|
| D0  | ∞       | ∞       | ∞       |
| d5  | 39.2856 | 13.4711 | 0.9985  |
| d13 | 0.0000  | 8.0000  | 16.0000 |
| d14 | 42.8194 | 50.9667 | 63.9884 |

(Aspherical Configuration of Third Surface)

$k = 0.6569$
$c2 = 0.0000$
$c4 = -0.43090 \times 10^{-5}$
$c6 = -0.14986 \times 10^{-7}$
$c8 = 0.26086 \times 10^{-10}$
$c10 = -0.26365 \times 10^{-12}$ Note that the condition corresponding values of the lens data given above are shown as below, $f_2/|f_1|=0.762$ (1)

$X_2/f_W=1.291$ (2)

$|f_1|/(f_W \cdot f_T)^{1/2}=1.01$ (3)

$|f_1|/f_T=0.618$ (4)

$f_2/f_T=0.471$ (5)

$(D_W-D_T)/f_W=1.33$ (6)

$Bf_W/f_W=1.487$ (7)

$q_1=-1.42$ (8)

It can be known from the values of items in the respective embodiments that the zoom lens is compactly constructed of a small number of lenses in each embodiment.

Then, an excellent image-forming performance is exhibited from the wide-angle end to the telephoto end in each embodiment.

Further, in accordance with each embodiment, the fixed diameter stop S is disposed in rear of the second lens group $G_2$ for effectively cutting the off-axis marginal rays that cause a large upper comatic aberration. Given is a moving trajectory different from that of the second lens group $G_2$. Though thus constructed, any moving trajectory may be provided on condition that the upper comatic aberration is effectively prevented. Then, an aperture stop A is disposed between the positive lenses $L_3$, $L_4$ of the second lens group in each of the embodiments. The aperture stop A may be, as a matter of course, disposed between the first and second lens groups $G_1$, $G_2$ and between the positive lens $L_4$ and the negative lens $L_5$.

Further, even when a third lens group having extremely small refracting power is disposed based on the present invention, the zoom lens can be considered identical because of substantially including the construction of the present invention. Accordingly, the same effects can be of course obtained.

Incidentally, the first to third embodiments involve the use of the glass lens having the aspherical surface. The 10 fourth embodiment involves the use of the aspherical lens made of the compound materials compounded by the glass material and the resinous material.

According to the present invention, it is feasible to attain the small-sized standard zoom lens constructed of an extremely small number of lenses and having a wide-angle end of approximately 74° at the variable power ratio on the order of 2.7 and a good image-forming performance at the low costs.

It is apparent that, in this invention, a wide range of different working modes can be formed based on the invention without deviating from the spirit and scope of the invention. This invention is not restricted by its specific working modes except being limited by the appended claims.

What is claimed is:

1. A standard phototaking zoom lens comprising, in order from the object side:

a first lens group constructed of a negative meniscus lens with its concave surface having a large curvature toward an image and a positive meniscus lens with its convex surface toward the object, said first lens group having negative refracting power on the whole; and a second lens group constructed of a plurality of lenses having at least one negative lens component and having positive refracting power on the whole, wherein said first lens group includes at least one aspherical surface in the lens surfaces of said negative and positive meniscus lenses, a process of variable power is performed by mutually altering a group-to-group space between said first and second lens groups, and further said first and second lens groups are constructed to satisfy the following conditions:

$0.6 < f_2/|f_1| < 1.0$ $1.0 \leq X_2/f_W \leq 1.8$ where $f_1$: the focal length of said first lens group, $f_2$: the focal length of said second lens group, $X_2$: the moving quantity of said second lens group from the wide-angle end to the telephoto end during the process of variable power, and $f_W$: the focal length of the whole system at the wide-angle end.

2. The standard phototaking zoom lens according to claim 1, wherein said first lens group is constructed to further satisfy the following condition:

$0.85 \leq |f_1|/(f_W \cdot f_T)^{1/2} \leq 1.2$ where $f_T$ is the focal length of the whole system at the telephoto end.

3. The standard phototaking zoom lens according to claim 1, wherein said first lens group is constructed to further satisfy the following condition:

$0.4 \leq f_1|/f_T \leq 0.9$ where $f_T$ is the focal length of the whole system at the telephoto end.

4. The standard phototaking zoom lens according to claim 1, wherein said second lens group is constructed to further satisfy the following condition:

$0.4 \leq f_2/f_T \leq 0.6$ where $f_T$ is the focal length of the whole system at the telephoto end.

5. The standard phototaking zoom lens according to claim 1, wherein said lens system is constructed to further satisfy the following condition:

$$1.1 < (D_W - D_T)/f_W < 1.7$$

where $D_W$ is the air space for the variable power between said first and second lens groups at the wide-angle end, and $D_T$ is the air space for the variable power between said first and second lens groups at the telephoto end.

6. The standard phototaking zoom lens system according to claim 1, wherein said lens system is constructed to further satisfy the following condition:

$$0.8 < Bf_W/f_W < 2$$

where $Bf_W$ is the back focus of the whole system at the wide-angle end.

7. The standard phototaking zoom lens according to claim 1, wherein the configurational factor $q_1$ of said negative meniscus lens of said first lens group is expressed such as $q_1 = (r_2 + r_1)(r_2 - r_1)$, said lens system is constructed to further satisfy the following condition:

$$-3 < q_1 < -1$$

where
$r_1$: the radius of curvature of a lens surface closer to the object, and
$r_2$: the radius of curvature of a lens surface closer to the image.

8. The standard phototaking zoom lens according to claim 1, wherein said lens system is constructed so that the moving quantity $X_2$ from the wide-angle end to the telephoto end during the process of variable power further satisfies the following condition:

$$1.1 \leq X_2/f_W \leq 1.81.$$

9. The standard phototaking zoom lens according to claim 2, wherein said first lens group is constructed so that the focal length $f_1$ further satisfies the following condition:

$$0.85 \leq |f_1|/(f_W f_T)^{1/2} \leq 1.1.$$

10. The standard phototaking zoom lens according to claim 3, wherein said first lens group is constructed so that the focal length $f_1$ further satisfies the following condition:

$$0.4 \leq |f_1|/f_T \leq 0.8.$$

11. The standard phototaking zoom lens according to claim 4, wherein said second lens group is constructed so that the focal length $f_2$ further satisfies the following condition:

$$0.4 \leq f_2/f_T \leq 0.55.$$

12. The standard phototaking zoom lens according to claim 1, wherein said second lens group is constructed of, in order from the object side, two pieces of positive lenses with the convex surface having a larger curvature toward the object, a biconcave negative lens and a biconvex positive lens with is surface having a larger curvature toward the image.

13. The standard phototaking zoom lens according to claim 12, wherein said second lens group is constructed to satisfy the following condition:

$$0.4 \leq f_2/f_T \leq 0.6$$

where $f_T$ is the focal length of the whole system at the telephoto end.

14. The standard phototaking zoom lens according to claim 12, wherein said lens system is constructed to further satisfy the following condition:

$$1.1 < (D_W - D_T)/f_W < 1.7$$

where $D_W$ is the air space for the variable power between said first and second lens groups at the wide-angle end, and $D_T$ is the air space for the variable power between said first and second lens groups at the telephoto end.

15. The standard phototaking zoom lens system according to claim 12, wherein said lens system is constructed to further satisfy the following condition:

$$0.8 < Bf_W/f_W < 2$$

where $Bf_W$ is the back focus of the whole system at the wide-angle end.

16. The standard phototaking zoom lens according to claim 12, wherein said lens system is constructed so that the moving quantity $X_2$ from the wide-angle end to the telephoto end during the process of variable power further satisfies the following condition:

$$1.1 \leq X_2/f_W \leq 1.8.$$

17. The standard phototaking zoom lens according to claim 13, wherein said second lens group is constructed so that the focal length $f_2$ further satisfies the following condition:

$$0.4 \leq f_2/f_T \leq 0.55.$$

18. The standard zoom lens according to claim 1, wherein said second lens group is constructed of, sequentially from the object, a biconvex positive lens with its surface having a larger curvature toward the object, a positive meniscus lens with its convex surface toward the object, a biconcave negative lens with its surface having a larger curvature toward the image and a biconvex positive lens with its surface having a larger curvature toward the image.

19. The standard zoom lens according to claim 1, wherein said second lens group is constructed of, sequentially from the object, two pieces of biconvex positive lenses with the surface having a larger curvature toward the object, a biconcave negative lens with its surface having a larger curvature toward the image and a biconvex positive lens with its surface having a larger curvature toward the image.

20. The standard zoom lens according to claim 1, wherein said second lens group is constructed of, sequentially from the object, a positive meniscus lens with its convex surface toward the object, a biconvex positive lens with its surface having a larger curvature toward the object, a biconcave negative lens with its surface having a larger curvature toward the image and a biconvex positive lens with its surface having a larger curvature toward the image.

21. The standard phototaking zoom lens according to claim 1, wherein said lens system is constructed in accordance with the data shown in the following Table 1:

TABLE 1 f = 28.8~77.6
2ω = 76.6~30.8
$F_{NO}$ = 3.4~5.8

|    | r        | d     | ν    | n       |
|----|----------|-------|------|---------|
| 1  | 98.649   | 2.20  | 49.5 | 1.77279 |
| 2  | *17.777  | 7.98  |      |         |
| 3  | 27.222   | 3.80  | 25.5 | 1.80458 |
| 4  | 43.912   | (d4)  |      |         |
| 5  | 26.406   | 3.50  | 60.0 | 1.64000 |
| 6  | −169.878 | 1.40  |      |         |
| 7  | 22.198   | 3.75  | 64.1 | 1.51680 |
| 8  | 269.188  | 0.70  |      |         |
| 9  | −65.583  | 7.00  | 28.6 | 1.79504 |
| 10 | 18.649   | 1.35  |      |         |
| 11 | 141.028  | 2.60  | 33.7 | 1.64831 |
| 12 | −30.106  | (d12) |      |         |
| 13 | 0.000    | (d13) |      |         |

(Variable Space in the Variable Power)

| f   | 28.8000 | 50.0000 | 77.6000 |
|-----|---------|---------|---------|
| D0  | ∞       | ∞       | ∞       |
| d4  | 39.2787 | 13.4651 | 0.9926  |
| d12 | 0.0000  | 8.0000  | 16.0000 |
| d13 | 42.5746 | 50.7214 | 63.7424 | where f is the focal length, $F_{NO}$ is the F-number, 2Ω is the field angle, the numerals at the left side of the Table represent the order from the object side, r is the radius of curvature of a lens surface, d is the space between lens surfaces, υ is the Abbe's number and n is the refractive index for a d-ray (λ=587.6 nm), * is the paraxial radius of curvature of an aspherical surface expressed by the formula:

$$x = \frac{y^2/y}{1+\{1-(ky^2/r^2)\}^{1/2}} + c_2 y^2 + c_4 y^4 + c_6 y^6 + c_8 y^8 + c_{10} y^{10}$$

where x is the distance in the optical-axis direction from a tangent plane of the vertex of each aspherical surface at the height y from the optical axis in the perpendicular direction, r is the paraxial radius of curvature, k is the conical constant, and $c_n$ is the n-order aspherical surface coefficient, and where (Aspherical Configuration of Second Surface)
k=0.6882
c2=0.0000
c4=−0.89347×10⁻⁶
c6=−0.40061×10⁻⁸
c8=0.89063×10⁻¹¹
c10=−0.10979×10⁻¹² wherein the lens satisfies the following conditions:

$|f_2/f_1|=0.762$      (1)

$X_2/f_w=1.291$      (2)

$|f_1|/(f_w f_T)^{1/2}=1.01$      (3)

$|f_1|/f_T=0.618$      (4)

$f_2/f_T=0.471$      (5)

$(D_W-D_T)/f_W=1.33$      (6)

$Bf_W/f_W=1.48$      (7)

$q_1=-1.44$      (8)

where $f_T$: the focal length of the whole system at the telephoto end, $D_W$: the air space with a variable power between the first and second lens groups at the wide-angle end, $D_T$: the air space with a variable power between the first and second lens groups at the telephoto end, $Bf_W$: the back focus of the whole system at the wide-angle end, $q_1$: the configurational factor of the negative meniscus lens of the first lens group expressed as $q_1=(r_2+r_1)/(r_2-r_1)$, where $r_1$: the radius of curvature of a lens surface closer to the object, and $r_2$: the radius of curvature of a lens surface closer to the image.

22. The standard phototaking zoom lens according to claim 1, wherein said lens system is constructed in accordance with the data shown in the following Table 2:

TABLE 2 f = 28.8~77.6
2ω = 76.6~31.0
$F_{NO}$ = 4.1~5.8

|    | r         | d     | ν    | n       |
|----|-----------|-------|------|---------|
| 1  | 94.753    | 2.20  | 49.5 | 1.77279 |
| 2  | *17.281   | 9.75  |      |         |
| 3  | 27.780    | 3.70  | 23.0 | 1.86074 |
| 4  | 39.888    | (d4)  |      |         |
| 5  | 31.343    | 4.50  | 60.0 | 1.64000 |
| 6  | −290.096  | 2.00  |      |         |
| 7  | 20.747    | 4.20  | 64.1 | 1.51680 |
| 8  | −1217.243 | 0.60  |      |         |
| 9  | −74.711   | 7.00  | 28.6 | 1.79504 |
| 10 | 18.885    | 1.45  |      |         |
| 11 | 84.036    | 3.50  | 35.7 | 1.62588 |
| 12 | −32.181   | (d12) |      |         |
| 13 | 0.000     | (d13) |      |         |

(Variable Space in the Variable Power)

| f   | 28.8000 | 50.0000 | 77.6000 |
|-----|---------|---------|---------|
| D0  | ∞       | ∞       | ∞       |
| d4  | 35.8192 | 12.3441 | 1.0018  |
| d12 | 0.0947  | 8.0947  | 16.0947 |
| d13 | 45.1311 | 55.4128 | 71.2131 | where f is the focal length, $F_{NO}$ is the F-number, 2Ω is the field angle, the numerals at the left side of the Table represent the order from the object side, r is the radius of curvature of a lens surface, d is the space between lens surfaces, υ is the Abbe's number and n is the refractive index for a d-ray (λ=587.6 rim), * is the paraxial radius of curvature of an aspherical surface expressed by the formula:

$$x = \frac{y^2/y}{1+\{1-(ky^2/r^2)\}^{1/2}} + c_2 y^2 + c_4 y^4 + c_6 y^6 + c_8 y^8 + c_{10} y^{10}$$

where x is the distance in the optical-axis direction from a tangent plane of the vertex of each aspherical surface at the height y from the optical axis in the perpendicular direction, r is the paraxial radius of curvature, k is the conical constant, and $c_n$ is the n-order aspherical surface coefficient, and where (Aspherical Configuration of Second Surface)
k=0.6917 c2=0.0000
c4=−0.21867×10⁻⁵ → $c_4 = -0.21867 \times 10^{-5}$
c6=−0.88603×10⁻⁸ → $c_6 = -0.88603 \times 10^{-8}$
c8=0.22651×10⁻¹⁰ → $c_8 = 0.22651 \times 10^{-10}$
c10=−0.17494×10⁻¹² → $c_{10} = -0.17494 \times 10^{-12}$ wherein the lens satisfies the following conditions:

$f_2/|f_1|=0.862$     (1)

$X_2/f_W=1.46$     (2)

$|f_1|/(f_W f_T)^{1/2}=0.910$     (3)

$|f_1|/f_T=0.554$     (4)

$f_2/f_T=0.478$     (5)

$(D_W - D_T)/f_W=1.21$     (6)

$Bf_W/f_W=1.57$     (7)

$q_1=-1.45$     (8)

where $f_T$: the focal length of the whole system at the telephoto end, $D_W$: the air space with a variable power between the first and second lens groups at the wide-angle end, $D_T$: the air space with a variable power between the first and second lens groups at the telephoto end, $Bf_W$: the back focus of the whole system at the wide-angle end, $q_1$: the configurational factor of the negative meniscus lens of the first lens group expressed as $q_1 = (r_2 + r_1)/(r_2 - r_1)$, where $r_1$: the radius of curvature of a lens surface closer to the object, and $r_2$: the radius of curvature of a lens surface closer to the image.

23. The standard phototaking zoom lens according to claim 1, wherein said lens system is constructed in accordance with the data shown in the following Table 3:

TABLE 3

$f = 28.8–77.6$
$2\omega = 76.6–30.8$
$F_{NO} = 3.6–5.8$

| | r | d | ν | n |
|---|---|---|---|---|
| 1 | 74.101 | 2.20 | 46.5 | 1.80411 |
| 2 | *18.259 | 7.99 | | |
| 3 | 25.715 | 3.60 | 23.0 | 1.86074 |
| 4 | 36.317 | (d4) | | |
| 5 | 26.205 | 3.00 | 60.0 | 1.64000 |
| 6 | 652.876 | 1.50 | | |
| 7 | 23.921 | 3.60 | 60.0 | 1.64000 |
| 8 | −304.097 | 0.50 | | |
| 9 | −66.935 | 7.00 | 28.6 | 1.79504 |
| 10 | 17.959 | 1.45 | | |
| 11 | 128.259 | 2.50 | 32.2 | 1.67270 |
| 12 | −33.575 | (d12) | | |
| 13 | .000 | (d13) | | |

(Variable Space in the Variable Power)

| f | 28.8000 | 50.0000 | 77.6000 |
|---|---|---|---|
| DO | ∞ | ∞ | ∞ |
| d4 | 40.1821 | 13.4269 | .4998 |

TABLE 3-continued $f = 28.8–77.6$
$2\omega = 76.6–30.8$
$F_{NO} = 3.6–5.8$

| | | | |
|---|---|---|---|
| d12 | 0.1857 | 7.8143 | 15.8143 |
| d13 | 42.5776 | 49.9876 | 62.0488 | where f is the focal length, $F_{NO}$ is the F-number, $2\Omega$ is the field angle, the numerals at the left side of the Table represent the order from the object side, r is the radius of curvature of a lens surface, d is the space between lens surfaces, $\upsilon$ is the Abbe's number and n is the refractive index for a d-ray ($\lambda=587.6$ nm), * is the paraxial radius of curvature of an aspherical surface expressed by the formula:

$$x = \frac{y^2/r}{1 + \{1 - (ky^2/r^2)\}^{1/2}} + c_2 y^2 + c_4 y^4 + c_6 y^6 + c_8 y^8 + c_{10} y^{10}$$

where x is the distance in the optical-axis direction from a tangent plane of the vertex of each aspherical surface at the height y from the optical axis in the perpendicular direction, r is the paraxial radius of curvature, k is the conical constant, and $c_n$ is the n-order aspherical surface coefficient, and where (Aspherical Configuration of Second Surface)

$k = 0.7512$
$c_2 = 0.0000$
$c_4 = -0.40277 \times 10^{-7}$
$c_6 = -0.72902 \times 10^{-8}$
$c_8 = 0.28656 \times 10^{-10}$
$c_{10} = -0.14031 \times 10^{-12}$ wherein the lens satisfies the following conditions:

$f_2/|f_1|=0.727$     (1)

$X_2/f_W=1.23$     (2)

$|f_1|/(f_W f_T)^{1/2}=1.06$     (3)

$|f_1|/f_T=0.644$     (4)

$f_2/f_T=0.467$     (5)

$(D_W - D_T)/f_W=1.38$     (6)

$Bf_W/f_W=1.47$     (7)

$q_1=-1.65$     (8)

where $f_T$: the focal length of the whole system at the telephoto end, $D_W$: the air space with a variable power between the first and second lens groups at the wide-angle end, $D_T$: the air space with a variable power between the first and second lens groups at the telephoto end, $Bf_W$: the back focus of the whole system at the wide-angle end, $q_1$: the configurational factor of the negative meniscus lens of the first lens group expressed as $q_1 (r_2 + r_1)/(r_2 - r_1)$, where $r_1$: the radius of curvature of a lens surface closer to the object, and r: the radius of curvature of a lens surface closer to the image.

24. The standard phototaking zoom lens according to claim 1, wherein said lens system is constructed in accordance with the data shown in the following Table 4:

TABLE 4 f = 28.8–77.6
2ω = 76.6–30.8
$F_{NO}$ = 3.4–5.8

| | r | d | ν | n |
|---|---|---|---|---|
| 1 | 97.086 | 2.20 | 49.5 | 1.77279 |
| 2 | 19.500 | .03 | 55.9 | 1.49712 |
| 3 | *16.891 | 7.81 | | |
| 4 | 26.633 | 3.80 | 25.5 | 1.80458 |
| 5 | 42.414 | (d5) | | |
| 6 | 25.554 | 4.10 | 60.0 | 1.64000 |
| 7 | –186.207 | 1.40 | | |
| 8 | 22.446 | 3.45 | 64.1 | 1.51680 |
| 9 | 267.680 | 0.70 | | |
| 10 | –61.313 | 6.85 | 28.6 | 1.79504 |
| 11 | 18.917 | 1.35 | | |
| 12 | 141.576 | 2.45 | 33.7 | 1.64831 |
| 13 | –29.366 | (d13) | | |
| 14 | 0.000 | (d14) | | |

(Variable Space in the Variable Power)

| f | 28.8000 | 50.0000 | 77.6000 |
|---|---|---|---|
| D0 | ∞ | ∞ | ∞ |
| d5 | 39.2856 | 13.4711 | 0.9985 |
| d13 | 0.0000 | 8.0000 | 16.0000 |
| d14 | 42.8194 | 50.9667 | 63.9884 | where f is the focal length, $F_{NO}$ is the F-number, 2Ω is the field angle, the numerals at the left side of the Table represent the order from the object side, r is the radius of curvature of a lens surface, d is the space between lens surfaces, υ is the Abbe's number and n is the refractive index for a d-ray (λ=587.6 nm), * is the paraxial radius of curvature of an aspherical surface expressed by the formula:

$$x = \frac{y^2/r}{1 + \{1 - (ky^2/r^2)\}^{1/2}} + c_2 y^2 + c_4 y^4 + c_6 y^6 + c_8 y^8 + c_{10} y^{10}$$

where x is the distance in the optical-axis direction from a tangent plane of the vertex of each aspherical surface at the height y from the optical axis in the perpendicular direction, r is the paraxial radius of curvature, k is the conical constant, and $c_n$ is the n-order aspherical surface coefficient, and where (Aspherical Configuration of Third Surface)
k=0.6569
c2=0.0000
c4=–0.43090×10⁻⁵
c6=–0.14986×10⁻⁷
c8=0.26086×10⁻¹⁰
c10=–0.26365×10⁻¹² wherein the lens satisfies the following conditions:

$|f_2|/|f_1|=0.762$ (1)

$X_2/f_W=1.291$ (2)

$|f_1|/(f_W \cdot f_T)^{1/2}=1.01$ (3)

$|f_1|/f_T=0.618$ (4)

$f_2/f_T=0.471$ (5)

$(D_W-D_T)/f_W=1.33$ (6)

$Bf_W/f_W=1.487$ (7)

$q_1=-1.42$ (8)

where $f_T$: the focal length of the whole system at the telephoto end, $D_W$: the air space with a variable power between the first and second lens groups at the wide-angle end, $D_T$: the air space with a variable power between the first and second lens groups at the telephoto end, $B_{fW}$: the back focus of the whole system at the wide-angle end, $q_1$: the configurational factor of the negative meniscus lens of the first lens group expressed as $q_1=(r_2+r_1)/(r_2-r_1)$, where $r_1$: the radius of curvature of a lens surface closer to the object, and $r_2$: the radius of curvature of a lens surface closer to the image.

25. A standard zoom lens comprising:

a first lens group constructed of, sequentially from an object, a negative meniscus lens with its concave surface having a large curvature toward an image and a positive meniscus lens with its convex surface toward the object, said first lens group having negative refracting power on the whole; and a second lens group constructed of, sequentially from the object, two pieces of positive lenses, a negative lens and a positive lens, said second lens group having positive refracting power on the whole, wherein said first lens group includes at least one aspherical surface in the lens surfaces of said negative and positive meniscus lenses, a process of variable power is performed by mutually altering a group-to-group space between said first and second lens groups, and said first and second lens groups are constructed to further satisfy the following conditions:

$0.85 \leq |f_1|/(f_W \cdot f_T)^{1/2} \leq 1.2$ $1.0 \leq X_2/f_W \leq 1.8$ where $f_1$: the focal length of said first lens group, $f_W$: the focal length of the whole system at the wide-angle end, $f_T$: the focal length of the whole system at the telephoto end, and $X_2$: the moving quantity of said second lens group from the wide-angle end to the telephoto end during the process of variable power.

26. The standard zoom lens according to claim 25, wherein said first and second lens groups are constructed to further satisfy the following condition:

$0.6 < f_2/|f_1| < 1.0$ where $f_2$: the focal length of said second lens group.

27. The standard zoom lens according to claim 25, wherein said first and second lens groups are constructed to further satisfy the following conditions:

$0.4 \leq |f_1|/f_T \leq 0.9$ $0.4 \leq f_2/f_T \leq 0.6$ $$1.1 < (D_W - D_T)/f_W < 1.7$$

where $f_2$: the focal length of said second lens group, $D_W$: the air space for the variable power between said first and second lens groups at the wide-angle end, $D_T$: the air space for the variable power between said first and second lens groups at the telephoto end.

28. The standard zoom lens system according to claim 25, wherein said lens system is constructed to further satisfy the following condition:

$$0.8 < Bf_W/f_W < 2$$

where $Bf_W$ is the back focus of the whole system at the wide-angle end.

29. The standard zoom lens according to claim 25, wherein the configurational factor $q_1$ of said negative meniscus lens of said first lens group is expressed such as $q_1 = (r_2 + r_1)/(r_2 - r_1)$, said lens system is constructed to further satisfy the following condition:

$$-3 < q_1 < -1$$

where $r_1$: the radius of curvature of a lens surface closer to the object, and $r_2$: the radius of curvature of a lens surface closer to the image.

30. A standard phototaking zoom lens comprising, in order from the object side:

a first lens group constructed of a negative meniscus lens with its concave surface having a large curvature toward an image and a positive meniscus lens with its convex surface toward the object, said first lens group having negative refracting power on the whole; and a second lens group constructed of a plurality of lenses having at least one negative lens component and having positive refracting power on the whole;

wherein said first lens group includes at least one aspherical surface in the lens surfaces of said negative and positive meniscus lenses, a process of variable power is performed by mutually altering a group-to-group space between said first and second lens groups, and further said first and second lens groups are constructed to satisfy the following conditions:

$$0.6 < f_2/|f_1| < 0.86$$

$$1.0 \leq X_2/f_W \leq 1.8$$

where $f_1$: the focal length of said first lens group, $f_2$: the focal length of said second lens group, $X_2$: the moving quantity of said second lens group from the wide-angle end to the telephoto end during the process of variable power, and $f_W$: the focal length of the whole system at the wide-angle end.

31. A standard phototaking zoom lens comprising, in order from the object side:

a first lens group constructed of a negative meniscus lens with its concave surface having a large curvature toward an image and a positive meniscus lens with its convex surface toward the object, said first lens group having negative refracting power on the whole; and a second lens group constructed of a plurality of lenses having at least one negative lens component and having positive refracting power on the whole;

wherein said first lens group includes at least one aspherical surface in the lens surfaces of said negative and positive meniscus lenses, a process of variable power is performed by mutually altering a group-to-group space between said first and second lens groups, and further said first and second lens groups are constructed to satisfy the following condition:

$$1.0 \leq X_2/f_W \leq 1.8$$

where $X_2$: the moving quantity of said second lens group from the wide-angle end to the telephoto end during the process of variable power, and $f_W$: the focal length of the whole system at the wide-angle end.

* * * * *